United States Patent [19]

Schmid et al.

[11] Patent Number: 4,667,192

[45] Date of Patent: May 19, 1987

[54] METHOD AND APPARATUS FOR BUS ARBITRATION USING A PSEUDO-RANDOM SEQUENCE

[75] Inventors: Mark E. Schmid, College Park; Robert L. Trapp, Laurel; Alexander E. Davidoff, Columbia, all of Md.

[73] Assignee: The Johns Hopkins University, Baltimore, Md.

[21] Appl. No.: 882,204

[22] Filed: Jul. 3, 1986

Related U.S. Application Data

[63] Continuation-in-part of Ser. No. 497,684, May 24, 1983, abandoned.

[51] Int. Cl.$^4$ ............................................. H04Q 9/00
[52] U.S. Cl. ................................. 340/825.5; 370/85
[58] Field of Search .................. 340/825.5; 370/85, 94

[56] References Cited

U.S. PATENT DOCUMENTS

| | | | |
|---|---|---|---|
| 4,063,220 | 12/1977 | Metcalfe et al. ................. | 340/825.5 |
| 4,259,663 | 3/1981 | Gable ............................... | 340/825.5 |
| 4,375,639 | 3/1983 | Johnson ........................... | 340/825.5 |
| 4,409,592 | 10/1983 | Hunt ................................. | 370/94 |
| 4,470,110 | 9/1984 | Chiarottino et al. ............. | 370/94 |
| 4,500,988 | 2/1985 | Bennett et al. ................... | 370/85 |
| 4,506,361 | 3/1985 | Kume ............................... | 370/85 |
| 4,584,575 | 4/1986 | Ryckeboer ....................... | 340/825.5 |

*Primary Examiner*—Donald J. Yusko
*Attorney, Agent, or Firm*—Robert E. Archibald; Howard W. Califano

[57] ABSTRACT

The present invention discloses a second level bus arbitration method and apparatus for use with a distributed computer network. The invention alleviates any simultaneous access possibility by requiring any computing element which claims access to the bus to first send a pseudo-random sequence over a common line using open collector logic. A computing element can access the bus if the sequence appearing on the common line is the sequence it transmitted. The invented arbitration system does not require central control or centralized clocking.

5 Claims, 3 Drawing Figures

METHOD AND APPARATUS FOR BUS ARBITRATION USING A PSEUDO-RANDOM SEQUENCE

STATEMENT OF GOVERNMENTAL INTEREST

The Government has rights in this invention pursuant to Contract No. N00024-81-C-5301 awarded by the Department of the Navy.

REFERENCE TO RELATED CASES

This is a continuation-in-part of co-pending application Ser. No. 497,684, filed May 24, 1983, and now abandoned.

BACKGROUND AND/OR ENVIRONMENT OF THE INVENTION

1. Field of the Invention

The present invention pertains generally to an apparatus and method of bus arbitration for a distributed computer network and, more particularly, to a bus contention scheme which efficiently alleviates the simultaneous access possibility.

2. Description of the Contemporary and/or Prior Art

With the increased interest in distributive computer networks, it is necessary to develop an efficient bus arbitration scheme. One class of distributive computer networks has no centralized controller to control communication over a common bus. In such cases the individual computing elements must each contain an arbitration means to determine whether that particular element can obtain access to the common bus. (The term "computing element" as used in this application can be any node in a network, such as a terminal, microcomputer, personal computer, tape drive, or processor.) If two or more computing elements desire to simultaneously access the common bus, the arbitration means must decide which computing element gains control of the common bus.

Prior art contention schemes required all computing elements to "back off" and reinitialize bus entry procedures if two or more computing elements simultaneously attempted to transmit on the common bus. This "back off" scheme as described in Metcalfe et al (U.S. Pat. No. 4,063,220 issued Dec. 13, 1977) is inefficient and slow during periods of high traffic volume.

SUMMARY OF THE INVENTION

The present inventors recognized the deficiencies in the prior art arbitration schemes and have invented an arbitration means which allows bus entry resolution even when two or more computing elements attempt to simultaneously transmit over the common bus. The invented apparatus and method incorporates an arbitration means in each computing element which allows each computing element to known whether the common bus is available for its use.

The invention must be used in association with a first level of contention arbitration in which each element requesting access to the bus must listen and wait until no other element is transmitting. This activity is accomplished, typically by unsynchronized sampling of a bus busy line. However, it is still possible for two or more computing elements to simultaneously access the common bus. The present invention acts as a second level of contention arbitration substantially alleviating any simultaneous access possibility.

As taught by the present invention, upon passing the first level arbitration, a computing element desiring access to the common bus immediately (barring signal propagation delay) sends a unique 5 MHz, 127 bit pseudo-random sequence over a common open collector line. The sequence parameters (e.g., rate and length) can be optimized to a particular distributed configuration. The computer element compares the sequence appearing on the common open collector line with the sequence it transmitted over the common open collector line. If two or more elements are simultaneously transmitting their unique sequence over the common open collector line, there will be a point at which one of the computing elements will detect a different signal on the common line than it had transmitted. Whichever computing element detects an error first will immediately withdraw from the common collector line, reset its first level arbitration, and wait for the bus to become available again. The remaining computing element continues its sequence error free and proceeds to use the data bus.

The invented method and apparatus thus assures that:
1. No contaminated data will be transmitted.
2. Each time a collision of pseudo-random sequences occurs, one of the computing elements will proceed to achieve uncontested access to the communications medium for data transmission.

A first novel feature is an apparatus and method of bus arbitration which does not require all computing elements to "back off" and reinitialize when two or more elements attempt to simultaneously transmit over the common bus. The invented method and apparatus assures that one of the elements will obtain control of the bus, assuring faster response than with prior art methods.

A second novel feature is a method and apparatus of bus arbitration wherein each computing element in a distributive computing system transmits a unique pseudo-random code over a common open collector line when it wishes to access the bus. Each element desiring access then listens over the common open collector line and backs off if a mismatch occurs between its generated sequence and the sequence appearing over the open collector line. If no mismatch occurs, the computing element can access the common bus.

These and other features, and advantages of the present invention will become apparent during the following Detailed Description of the Preferred Embodiment of the invention.

BRIEF DESCRIPTION OF THE DRAWINGS

The present invention is illustrated in the accompanying drawings, wherein.

DETAILED DESCRIPTION OF THE PREFERRED EMBODIMENT

Figure 1:
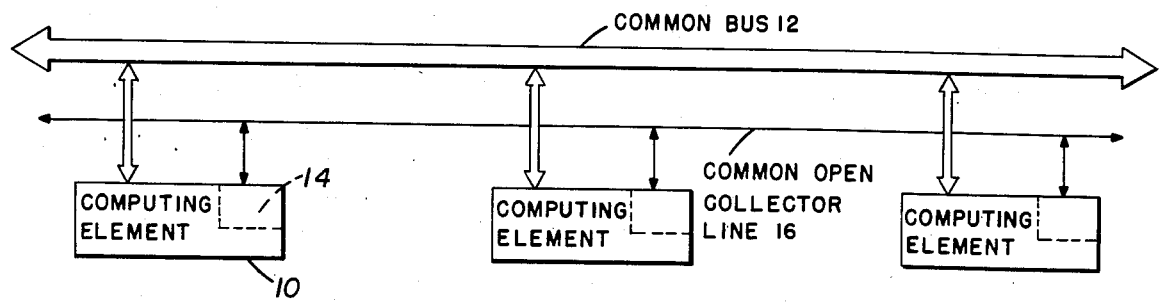
FIG. 1 is a block diagrammatic view of a distributive computing system using the present invention.

FIG. 1 is a block diagrammatic view of a distributive computing system which utilizes the present invention. Each computing element 10 transmits and receives data over common bus 12 and employs a bus busy line 50 to globally communicate activity/inactivity of the bus. Each computing element 10 includes a first arbitration means 52 and a second arbitration means 14 which transmits a unique pseudo-random preamble sequence over a common open collector line 16 when the first level contention arbitration is passed. The issuance of a competing computer element's preamble sequence is coordinated by the passing of the first level arbitration. Any elements passing first level arbitration will do so within a variance controlled by propagation delays. Immediate activation of the second level arbitration mechanism on passing the first level maintains a timing tolerance between competing computer elements that is more than adequate for second level resolution. The arbitration means 14 listens to the sequence appearing on the common open collector line 16 and compares it to the generated sequence. If a mismatch occurs, the arbitration means 14 will inhibit the pseudo-random sequence from the common open collector line 16. If, however, no mismatch is detected, the arbitration means 14 will instruct the computing element 10 to access the common bus 12 when the preamble sequence is complete.

Figure 2:
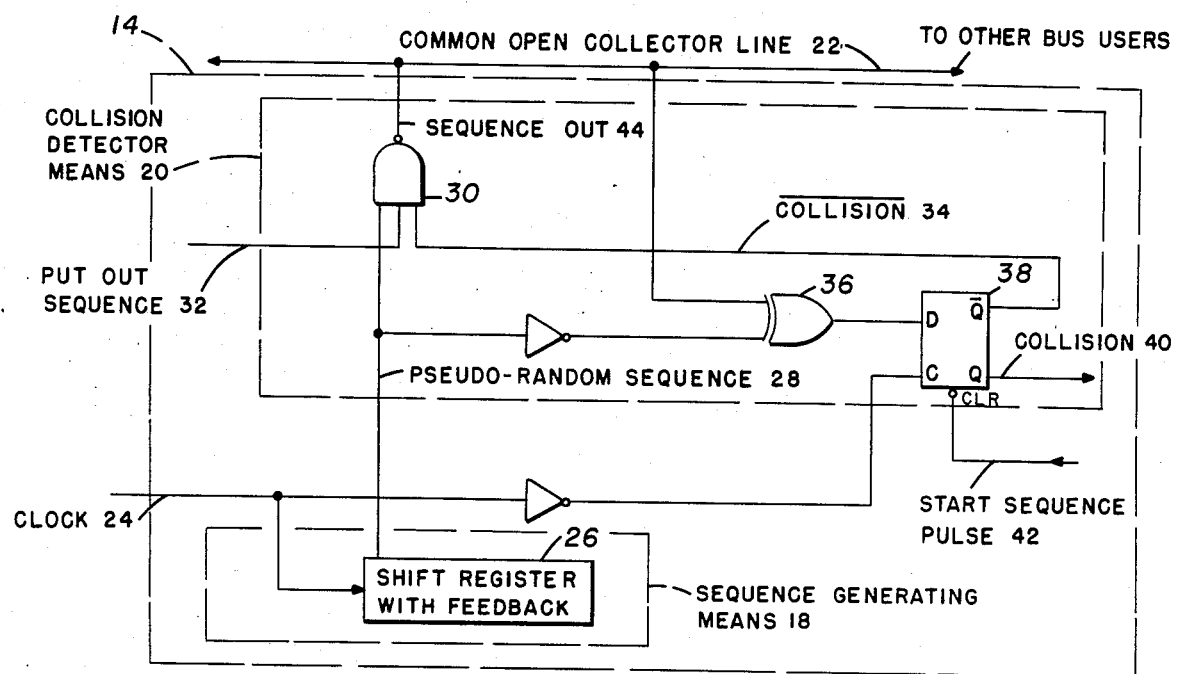
FIG. 2 is a circuit diagram showing a specific embodiment of the present invention; and, FIG. 3 is a timing diagram which illustrates a collision detected on the common open collector.

FIG. 2 is a circuit diagram showing an embodiment of the invented arbitration scheme which comprises: a first level arbitration means 52 for checking and asserting the global bus busy line 50, a sequence generating means 18 for generating a sequence on common open collector line 22, and, a collision detection means 20 which compares the sequence appearing on the common open collector line 22 with the sequence generated by that computing element. The common open collector line 22 connects to all the computing elements using the common data bus. A clock pulse is sent to a shift register with feedback 26 which generates a local pseudo-random sequence 28. NAND gate 30 (which is an open collector gate) receives as inputs: the pseudo-random sequence 28; an output sequence control signal 32, which is high during the actuation of the arbitration means 14; and, a collision line 40 which goes low when there is no error between the received and transmitted sequence. An exclusive OR gate 36 receives as input the sequence appearing on the common open collector line 22, and the inversion of pseudo-random sequence 28. A flip-flop 38 is connected to the inverted clock signal 24 that is locally generated in each computing element and to the output from the exclusive OR gate 36. Output collision 40 from flip-flop 38 will go high when exclusive OR gate 36 detects an error between a transmitted sequence 28 and a sequence appearing on the common open collector line 22. When collision 40 goes high, the first level pass line 32 will be reset low and will effectively disengage this computing element from the common open collector line.

In operation, bus arbitration is initiated when the computing element requests access to the bus and makes request line 60 go active. Upon successfully passing the first level of arbitration, the computing element asserts bus busy line 50, activates first level pass line 32, and causes start sequence pulse 42 to pulse low thus initiating second level arbitration. The generated sequence 28 is compared to the sequence appearing on the common open collector line 22. If a collision is detected, Collision line 40 goes active resets the first level arbitration means, causing the element to withdraw its assertion of bus busy line 50 and to deactivate first level pass line 32. If, however, the complete sequence has been transmitted (as indicated by end sequence 54) and collision line 40 has not reset first level arbitration means 52, then second level pass line 58 will be activated and the particular computing element can access the common data bus for data transmission.

Figure 3:
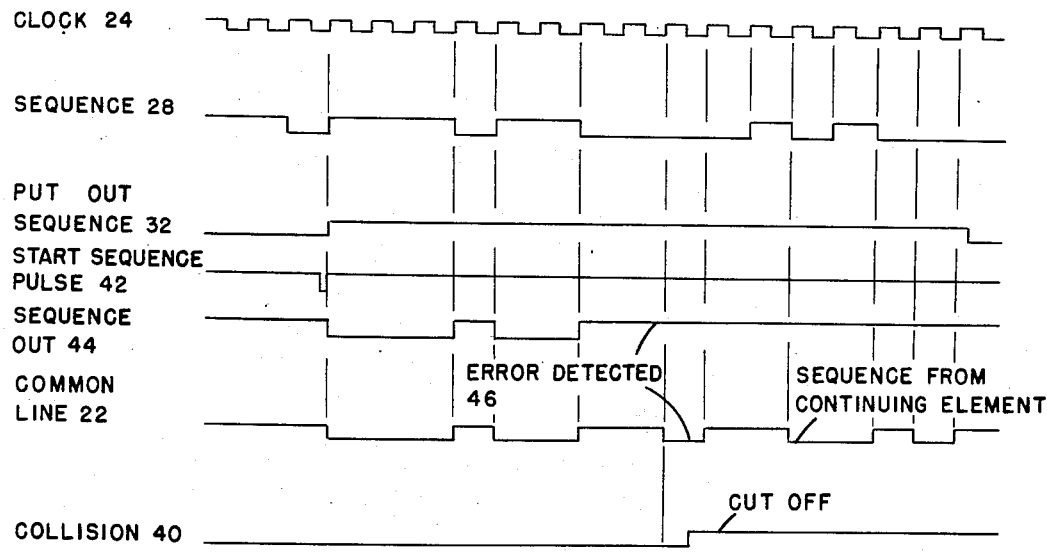

This operation might best be explained in terms of the timing diagram shown in FIG. 3 which illustrates the invented arbitration scheme. The Sequence Out 44 is the pseudo-random sequence 28 generated by a particular computing element and transmitted over the common open collector line during that period when the first level pass line 32 and end sequence line 54 are high, i.e., when that computing element wishes to transmit data over the common bus (see FIG. 1, element 12). The sequence read from the common open collector line 22 is a composite sequence generated by each of the computing elements attempting to gain access to the common bus. Since each arbitration means 14 is connected to the common line using open collector logic (i.e., NAND gate 30, see FIG. 2, is an open collector gate), the line will be driven low when any pulse introduced onto the open collector is low. For example, if three computing elements simultaneously generate a high pulse on the open collector line, the line will be high; however, if any one of the computing elements generates a low pulse, the signal appearing on the common line will be low.

FIG. 3 illustrates an error detection at 46 when the sequence appearing on the common line is low (i.e., one of the computing elements attempting to access the common bus has simultaneously generated a low pulse during this part of its generated sequence) and the Sequence Out 44 generated by the particular computing element is high. When such an error is detected, collision 40 is asserted which resets first level pass line 32 and thereby inhibits sequence out 44 and alerts the particular computing element that it can't currently access the common bus. The randomness of the entire bus allocation process allows equal access when multiple elements are using the bus heavily. The fact that one element will always continue and achieve bus access, achieves faster response than prior art systems which require all elements to withdraw from the bus when contention is detected.

It will be understood that various changes in the details, herein described and illustrated in order to explain the nature of the invention, may be made by those skilled in the art within the principles and scope of the present invention.

Having set forth the nature of the invention, what is claimed is:

1. A second level bus arbitration apparatus for use with a distributed computing network, said distributive computing network comprising a first level of contention and a plurality of computing elements, said second level bus arbitration apparatus being initiated when at least one computing element successfully completes the first level of contention, said second level bus arbitration apparatus comprising:
   a common data bus operably connected to each of said plurality of computing elements;
   a common line;
   a plurality of locally clocked arbitration means operably connected to said common line for allowing one of said plurality of computing elements access to said common data bus, wherein each one of said plurality of arbitration means is associated with a corresponding one of said computing elements, said each one of said plurality of arbitration means further comprising, a means for generating a pseudo-random sequence and transmitting said generated sequence over said common line when said corresponding computing element requests access to said common data bus and prior to the transmission of actual data on said common data bus; and, a collision detection means operably connected to said generating means and said common line for withdrawing said corresponding computing element from said common line when a composite signal appearing on said common line differs from said generated sequence, if no such difference is detected said corresponding computing element proceeds to transmit actual data on said common data bus.

2. The apparatus of claim 1 wherein said generating means and said collision detection means connect to said common line using open collector logic such that a composite bit appearing on said common line will go low when any bit of said generated pseudo-random sequence transmitted over said common line goes low, wherein any computing element generating a low bit will not withdraw from said common line when the composite bit appearing on said common line is low.

3. The apparatus of claim 2 wherein said collision detection means further comprises:

an exclusive OR gate connected to said common open collector and said generating means, receiving as input said signal sequence appearing on said common line and an inverse of said generated sequence; and, a flip-flop connected in association with said exclusive OR gate said generating means and said corresponding computing element, for disengaging said generating means from said common line and alerting said corresponding computing element that said common bus is not available, when said exclusive OR gate detects an error between said generated sequence and said sequence appearing on said common line.

4. A method of second level bus arbitration for a distributed computing network, said distributive computing network comprising a first level of contention and a plurality of computing elements with each computing element connected over a common bus, said method of second level bus arbitration initiated when at least one computing element successfully completes the first level of contention and comprising the steps of:

each of said computing element requiring access to said common bus generates a separate pseudo-random sequence, each sequence generated by a particular computing element being transmitted over a common line;

each particular computing element comparing a sequence appearing on said common line with said sequence generated by said particular computing element;

a particular computing element withdrawing from the common open collector if a mismatch occurs between said sequence generated by said particular computing element and said sequence appearing on said common collector; and, instructing a particular computing element to access said common bus if said sequence generated by said particular computing element is completed with no mismatch detected between said sequence generated by said particular computing element and said sequence appearing on said common line thereby performing second level bus arbitration without the use of centralized control or centralized clocking.

5. The method of claim 4, wherein each generated pseudo-random sequence is transmitted over said common line using open collector logic such that a composite bit appearing on said common line will go low when any bit of said generated pseudo-random sequence transmitted over said common line goes low.

* * * * *